US008688680B2

(12) United States Patent
Mani et al.

(10) Patent No.: US 8,688,680 B2
(45) Date of Patent: Apr. 1, 2014

(54) SYSTEM AND METHOD FOR PREFERRED SERVICES IN NOMADIC ENVIRONMENTS

(75) Inventors: Kumar Mani, Maywood, NJ (US); Purushothaman K. Narayanan, Bangalore (IN); Hema Venkata, Tamilnadu (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/453,325

(22) Filed: Apr. 23, 2012

(65) Prior Publication Data

US 2012/0208565 A1    Aug. 16, 2012

Related U.S. Application Data

(62) Division of application No. 12/028,151, filed on Feb. 8, 2008, now Pat. No. 8,234,264.

(51) Int. Cl.
*G06F 17/30* (2006.01)
*G06F 7/00* (2006.01)

(52) U.S. Cl.
USPC ............................ 707/708; 707/802; 709/229

(58) Field of Classification Search
None
See application file for complete search history.

(56) References Cited

U.S. PATENT DOCUMENTS

| | | | |
|---|---|---|---|
| 6,252,605 B1 * | 6/2001 | Beesley et al. | 345/441 |
| 6,751,459 B1 | 6/2004 | Lee et al. | |
| 6,868,410 B2 * | 3/2005 | Fortin et al. | 706/45 |
| 7,071,842 B1 | 7/2006 | Brady, Jr. | |
| 7,079,499 B1 | 7/2006 | Akhtar et al. | |
| 7,088,727 B1 | 8/2006 | Short et al. | |
| 7,155,425 B2 | 12/2006 | Nykanen | |
| 7,239,989 B2 | 7/2007 | Kothuri | |
| 2002/0188581 A1 | 12/2002 | Fortin et al. | |
| 2004/0036611 A1 | 2/2004 | Kidney et al. | |
| 2005/0152305 A1 | 7/2005 | Ji et al. | |
| 2005/0165788 A1 * | 7/2005 | Yang et al. | 707/10 |
| 2005/0188092 A1 | 8/2005 | Short et al. | |
| 2005/0286522 A1 * | 12/2005 | Paddon et al. | 370/389 |
| 2006/0280236 A1 | 12/2006 | Rhee et al. | |

OTHER PUBLICATIONS

Wang, Z et al., "An Agent-based Distributed Service Model for Nomadic Users", 2001, pp. 681-688.

Guttman, A., "R-Trees: A Dynamic Index Structure for Spatial Searching", Research was sponsored by National Science Foundation gran ECS-8300463 and Air Force Office of Scientific Research grant AFOSR-83-0254., 1984, pp. 47-57.

* cited by examiner

*Primary Examiner* — Kuen Lu
(74) *Attorney, Agent, or Firm* — Matthew Chung; Roberts Mlotkowski Safran & Cole, P.C.

(57) ABSTRACT

A method of locating preferred services includes searching an augmented spatial index, which is based on a user's determined preferred services. Additionally, the method includes indicating a location of a currently-sought preferred service.

20 Claims, 11 Drawing Sheets

Fig. 1

| ID | Item | Type | Distance (in feet) | Price |
|---|---|---|---|---|
| ▦ | Restaurant | Mexican | 200 | 15 |
| ▢ | Coffee shop | Gourmet | 300 | 10 |
| ▨ | Printer | Color & B/W | 450 | 2 |
| ▦ | Wireless LAN Spot | Train Station | 1800 | 8 |
| ▨ | Printer | B/W | 450 | 1 |

SYSTEM AND METHOD FOR PREFERRED SERVICES IN NOMADIC ENVIRONMENTS

CROSS REFERENCE TO RELATED APPLICATION

This application is a divisional application of copending U.S. patent application Ser. No. 12/028,151 filed on Feb. 8, 2008, the contents of which are incorporated herein by reference in their entirety.

FIELD OF THE INVENTION

The invention generally relates to a system and method for preferred services in nomadic environments and, more particularly, to a system and method for establishing, searching for, locating and updating preferred services in nomadic environments.

BACKGROUND OF THE INVENTION

In an increasingly interconnected world, nomadic users require efficient and accurate ways to identify preferred services. Nomadic users are characterized by frequent changes in location and how they access services. For example, a business traveler may be nomadic when he commutes to work: the traveler switches between a wired network, a wide-area wireless network, a cellular network and finally a wireless LAN back at the office.

Preferred services are services of interest to the nomadic user. For example, a preferred service may include coffee shops, nearest subway stations, photographic film developers, printer services, and restaurants, amongst other preferred services.

However, nomadic users face several challenges. It is often difficult to characterize a user's present position, and because of this, it is difficult to identify the user's preferred services near their present position. Moreover, a nomadic user's needs, e.g., currently-sought preferred services, may change with respect to their present position, which affects timely and accurate notification about the preferred services. Additionally, as nomadic users' current location, preferred services and/or currently-sought preferred services may dynamically change, nomadic users need efficient ways to record and manage information about their current location, their preferred services, and their currently-sought preferred services.

Accordingly, there exists a need in the art to overcome the deficiencies and limitations described hereinabove.

BRIEF SUMMARY

In a first aspect of the invention, a method is provided for locating preferred services. The method comprises searching an augmented spatial index, which is based on a user's determined preferred services. Additionally, the method comprises indicating a location of a currently-sought preferred service.

In a further aspect of the invention, a method comprises providing a computer infrastructure. The computer infrastructure is operable to create and update an augmented spatial index based on preferred services. Additionally, the computer infrastructure is operable to search the augmented spatial index and indicate a location of a currently-sought preferred service.

In an additional aspect of the invention, a computer program product comprises a computer usable medium having computer readable program code embodied in the medium. The computer readable program code is operable to search an augmented spatial index and indicate a location of a currently-sought preferred service.

In a further aspect of the invention, a system comprises a matching vector creation tool configured to create at least one matching vector, an augmenting/updating tool configured to at least one of create and update an augmented spatial index and a user vector creation tool configured to create at least one user vector. Additionally, the system comprises a position-deriving tool configured to determine a current location and a searching tool configured to locate currently-sought preferred services using the augmented spatial index based on the at least one matching vector, the at least one user vector and the current location.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention generally relates to a system and method for preferred services in nomadic environments and, more particularly, to a system and method for establishing, searching for, locating and updating preferred services in nomadic environments. By implementing the invention, it is possible for a user to establish and search for preferred services in nomadic environments. Moreover, it is possible for a user to search for preferred services in nomadic environments faster and more efficiently as compared to conventional methods, which utilize, e.g., an exhaustive brute force method. The exhaustive brute force method operates by, for example, returning as a search result all the, e.g., coffee shops within a two-mile radius. Thus, the exhaustive brute force method suffers from performance drawbacks that are not acceptable for nomadic users.

The present invention solves the two-fold challenges of nomadic users, namely location mobility and identification of preferred services, that are not addressed by the known methods. Moreover, by implementing the present invention, improvement upon known search methods of at least 40% (for a sample dataset of 700,000 points) may be achieved. Furthermore, the present invention dynamically adapts to nomadic conditions like changing locations of the user and the preferred services applicable thereto.

System Environment

Figure 1:
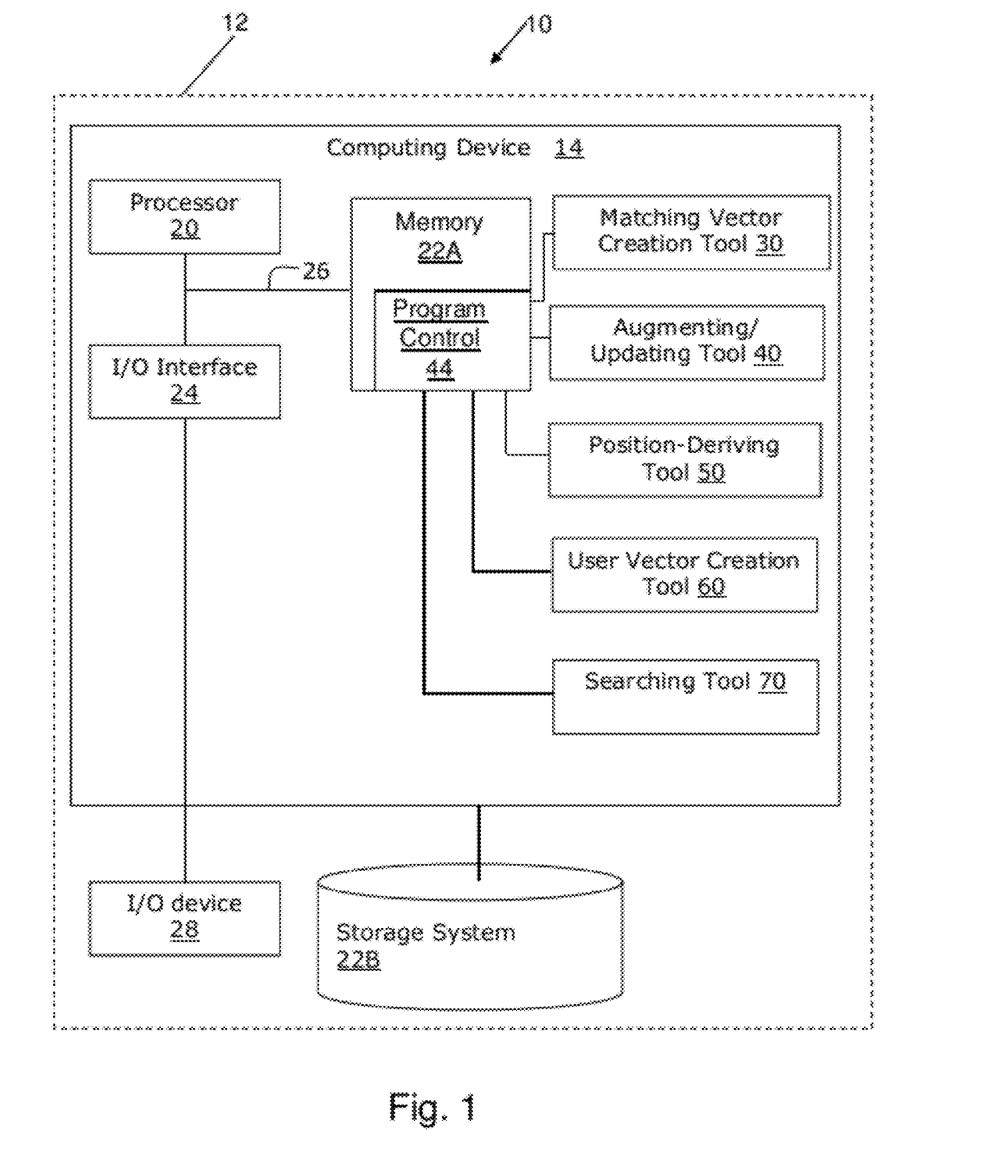
FIG. 1 shows an illustrative environment for implementing the processes in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a matching vector construction tool 30 operable to construct matching vectors, an augmenting/updating tool 40 operable to augment and/or update a spatial index, e.g., an R-tree, with the matching vectors, a position-deriving tool 50 operable to derive a user's current position, a user vector creation tool 60 operable to create a user vector, and a searching tool 70 operable to search the augmented spatial index, for example, the augmented R-tree, e.g., the process described herein.

The computing device 14 includes a processor 20, a memory 22A, an input/output (I/O) interface 24, and a bus 26. Further, the computing device 14 is in communication with an external I/O device/resource 28 and a storage system 22B. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The processor 20 executes computer program code (program control 44), which is stored in memory 22A and/or storage system 22B. While executing computer program code, the processor 20 can read and/or write data to/from memory 22A, storage system 22B, and/or I/O interface 24. The computer program control 44 executes the processes of the invention as discussed herein.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a Client/Server) that communicate over any type of communications link, such as a network, a shared memory, or the like, to perform the processes described herein. Further, while performing the processes described herein, one or more computing devices in the computer infrastructure 12 can communicate one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

A service provider can create, maintain, deploy and/or support the infrastructure such as that described in FIG. 1. The service provider, such as a Solution Integrator, advertiser, etc., could offer to perform the processes described herein for payment from the customer(s) under a subscription and/or fee agreement and/or the service provider can receive payment from the sale of advertising content to one or more third parties.

According to the invention, the system and method comprise a creation of a data structure (e.g., an augmented R-tree), a searching of the data structure, and methods to store and update the data structure.

Data Structure

According to an aspect of the invention, a user may create a data structure which includes a plurality of matching vectors augmenting a spatial index. The matching vector may be created using the matching vector creation tool 30. As described herein, the matching vector facilitates establishing, searching and updating of preferred services of a user in nomadic environments. The user may use the matching vector creation tool 30 to create matching vectors indicating the types of preferred services of the nomadic user and the preferences applicable thereto. Moreover, as described further below, in the data structure, the matching vector serves as the link between two dimensions of an existing spatial indexing method, such as, for example, an R-tree, an R+-tree (R plus tree), or an R*-tree (R star tree).

Figure 2:
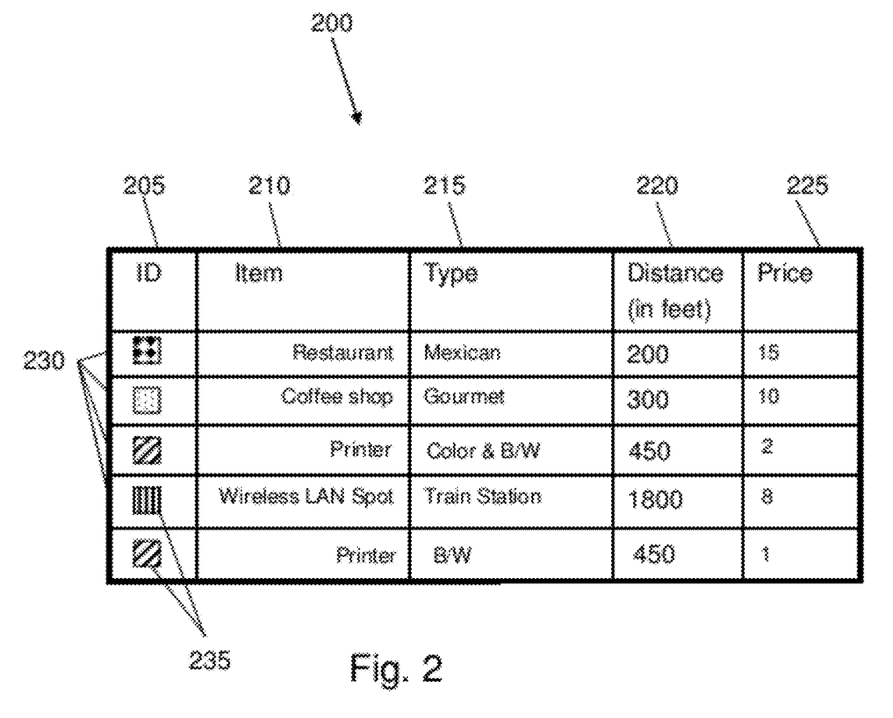
FIG. 2 shows an exemplary embodiment of a matching vector data table in accordance with the invention.

FIG. 2 shows an exemplary tabular representation of a matching vector data table 200. The user may create the matching vector data table 200 using the matching vector creation tool 30 of FIG. 1. In embodiments, the user may utilize an I/O device 28, for example, a keyboard, a mouse or other pointing device, a voice recognition system, a display or screen (e.g., a touch screen) and/or combinations thereof, amongst other data entry systems, to enter data into the matching vector creation tool 30 and/or the matching vector data table 200. Moreover, in embodiments, the matching vector data table 200 may be displayed to the user via, e.g., the display or screen. The matching vector data table 200 may be stored in a database in, e.g., the storage system 22B of FIG. 1.

In embodiments, the user may configure and/or update in real-time the matching vector data table 200 with additional information using the matching vector creation tool 30. For example, as a nomadic user travels, the user may discover a preferred service at a particular location. The user, via the matching vector creation tool 30, may then update the matching vector data table 200 to indicate the newly discovered preferred service. Additionally, the location of this preferred service may be determined and stored in a database, e.g., in the storage system 22B, using the position-deriving tool 50 (discussed further below). That is, while not shown in the matching vector data table 200, for each entry 230 in the matching vector data table 200, the geographical location of the entry 230 is stored in a storage device, e.g., in a database in the storage system 22B of FIG. 1. Additionally, as discussed further below, upon configuring/updating the matching vector data table 200, the spatial index may be configured/updated, e.g., manually or automatically, to reflect the information contained in the matching vector data table 200.

As shown in FIG. 2, the matching vector data table 200 may include columns for "ID" 205, "Item" 210, "Type" 215, "Distance" 220, and "Price" 225, amongst other columns. Additionally, the matching vector data table 200 includes rows 230 for actual instances of the user's preferred services. That is, each row 230 of the matching vector data table 200 corresponds to an actual instance of a preferred service at some location for a particular user. In other words, as explained further below, the "Item" column 210 and "Type" column 215 may be index references (binary) in a linear list of instances, e.g., "Restaurant" or "Coffee shop".

The "ID" column 205 may contain a unique identification 235 that identifies the particular item or type of preferred service listed in the "Item" column 210 and/or the "Type" column 215. In embodiments, the unique identification 235 may be designated by a pattern, a color, an alphanumeric character(s), and/or a combination thereof, amongst other unique identifications. Moreover, in embodiments, the unique identification 235 may be, e.g., selected by a user or a service provider, or generated automatically by the matching vector creation tool 30. Additionally, in embodiments, the unique identification 235 may be utilized by the present invention while remaining hidden to the user.

The "Item" column 210 may contain indications of the nomadic user's preferred services. As shown in the exemplary matching vector data table 200 of FIG. 2, this particular nomadic user is interested in restaurants, coffee shops, printers and wireless local area network (LAN) spots. As should be understood, the matching vector data table 200 may contain any number of items of preferred services. Moreover, as described further below, the items of preferred services may be configurable and customizable by the nomadic user.

The "Type" column 215 may contain further information describing the corresponding preferred service listed in the "Item" column 210. For example, a restaurant may be further described as a Mexican restaurant and a coffee shop may be described as a gourmet coffee shop. Additionally, the invention contemplates that a user may describe, e.g., a restaurant or a coffee shop with its brand name. As should be understood, the "Type" column 215 may contain any information that further describes the corresponding preferred service listed in the "Item" column 210.

Moreover, as mentioned above, the ID column 205 may identify the "Item" column 210, the "Type" column 215, or both. That is, a user may configure the present invention such that the unique ID 235 corresponds to the "Item" column 205. This is shown in the exemplary matching vector data table 200, wherein the two listings of "Printer" each have the same unique ID 235. It should be noted, however, as indicated in the "Type" column 215, that the two printers are of different types. That is, one printing service can provide color and black and white prints; whereas the other printing service can only provide black and white prints. Thus, the invention contemplates that the unique ID 235 may correspond to the "Type" column 215 instead of or in addition to the "Item" column 210, such that a user could search specifically for services, e.g., color printing services.

The "Distance" column 220 may contain a distance the nomadic user is willing to travel from their current position to a location of the preferred service. Thus, as shown in the exemplary matching vector data table 200 of FIG. 2, this particular nomadic user is willing to travel two hundred feet from their current position to a restaurant and is willing to travel four hundred-fifty feet from their current position to a printer service. While the distance shown in FIG. 2 is in feet, it should be understood that the distance may be quantified in any distance unit. Moreover, while the distance data is represented as decimals, it should be understood that the distance data may be encoded in binary-coded decimal (BCD) or other acceptable database format. Furthermore, in embodiments, the units of distance may be configurable by, e.g., a user or a service provider, amongst others.

The "Price" column 225 may contain a quantification of price of the corresponding preferred service listed in the "Item" column 210. While shown in the exemplary matching vector data table 200 as a single price, the invention contemplates that the "Price" column 235 may contain a price range. Moreover, while the price data is represented as decimals, it should be understood that the price data may be encoded in binary-coded decimal (BCD) or other acceptable database format.

As described above, the data structure of the present invention may be an augmented spatial index. The augmented spatial index includes matching vectors as a link between two dimensions of a spatial index, such as, for example, an R-tree, an R+-tree, or an R*-tree.

Figure 3:
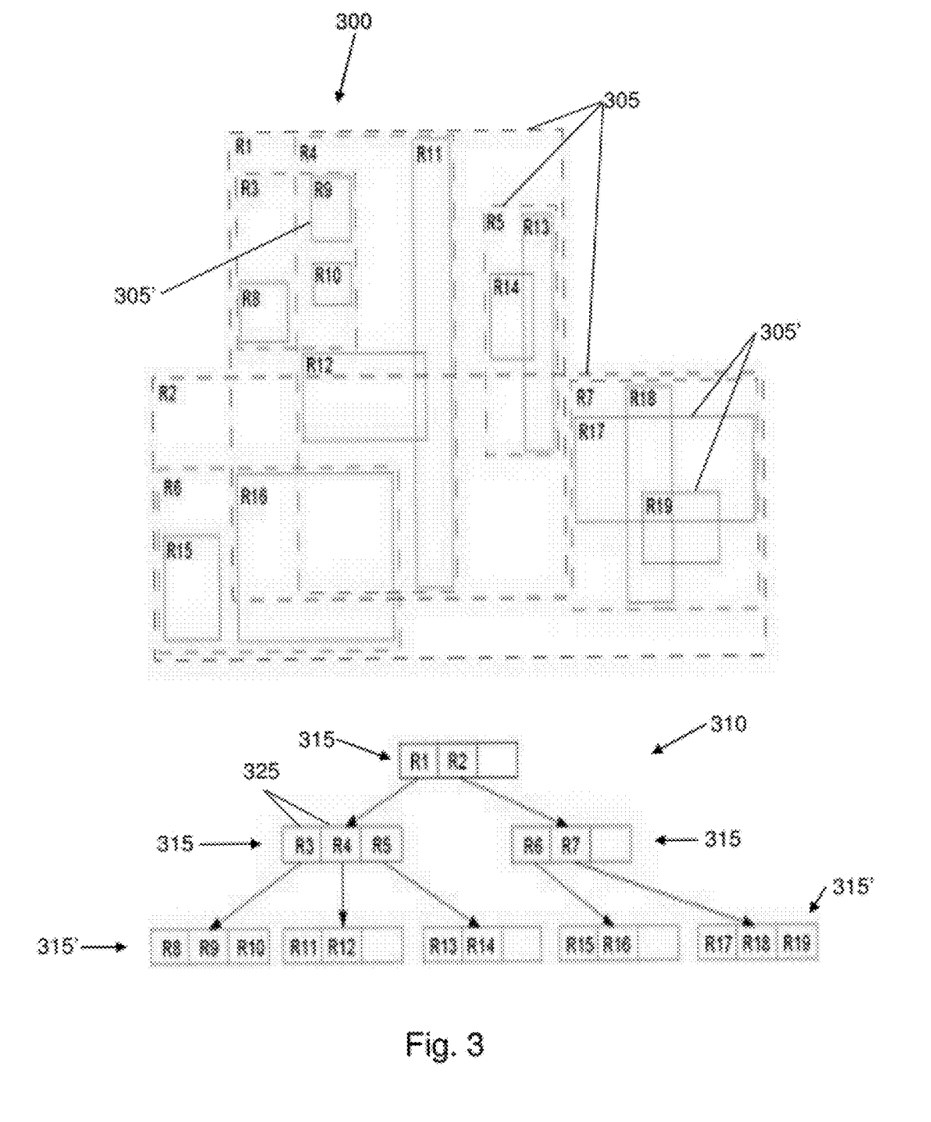
FIG. 3 shows an R-tree and corresponding data structure.

FIG. 3 shows an R-tree 310 along with the data structure 300 comprising a plurality of minimum bounding rectangles, or minimum bounding boxes (MBBs) 305, 305' used to structure the R-tree 310. An R-tree 310 is a tree data structure that may be used for spatial access methods, i.e., for indexing multi-dimensional information, for example, the (X,Y) coordinates of geographical data. The data structure 300 splits space with hierarchically nested, and possibly overlapping, MBBs 305, 305'. Each node 315, 315' of an R-tree 310 has a variable number of entries, or data points 325 (in embodiments, up to some pre-defined maximum). Each entry 325 within a non-leaf node, or index node 315, stores two pieces of data: a way of identifying a child node, and the bounding box of all entries within this child node. Each entry 325 within a leaf node 315' stores the bounding box of all entries within this leaf node 315'.

The insertion and deletion methods use the MBBs from the nodes to allow "nearby" elements to be placed in the same leaf node (in embodiments, a new element may go into the leaf node that requires the least enlargement in its MBB). Similarly, R-tree searching methods (for example, intersection, containment, nearest) use the MBBs to decide whether or not to search inside a child node. In this way, most of the nodes in the tree are never "touched" during a search.

An R+-tree is another spatial index that is a variant of the R-tree. R+-trees are similar to R-trees, but avoid overlapping of internal nodes by inserting an object into multiple leaves if necessary. In other words, R+-trees differ from R-trees in that: nodes are not guaranteed to be at least half filled; the entries of any internal node do not overlap; and an object ID may be stored in more than one leaf node. With R+-trees, point query performance may benefit since all spatial regions are covered by at most one node, because nodes are not overlapped with each other. Thus, a single path is followed and fewer nodes are visited than with the R-tree.

An R*-tree is another spatial index, which is a variant of an R-tree. An R*-tree supports point and spatial data at the same time with a slightly higher cost than other R-trees. The R*-tree attempts to reduce both coverage and overlap, using a combination of a revised node split method and a concept of forced reinsertion at node overflow, as is understood by one of ordinary skill in the art.

Figure 4:
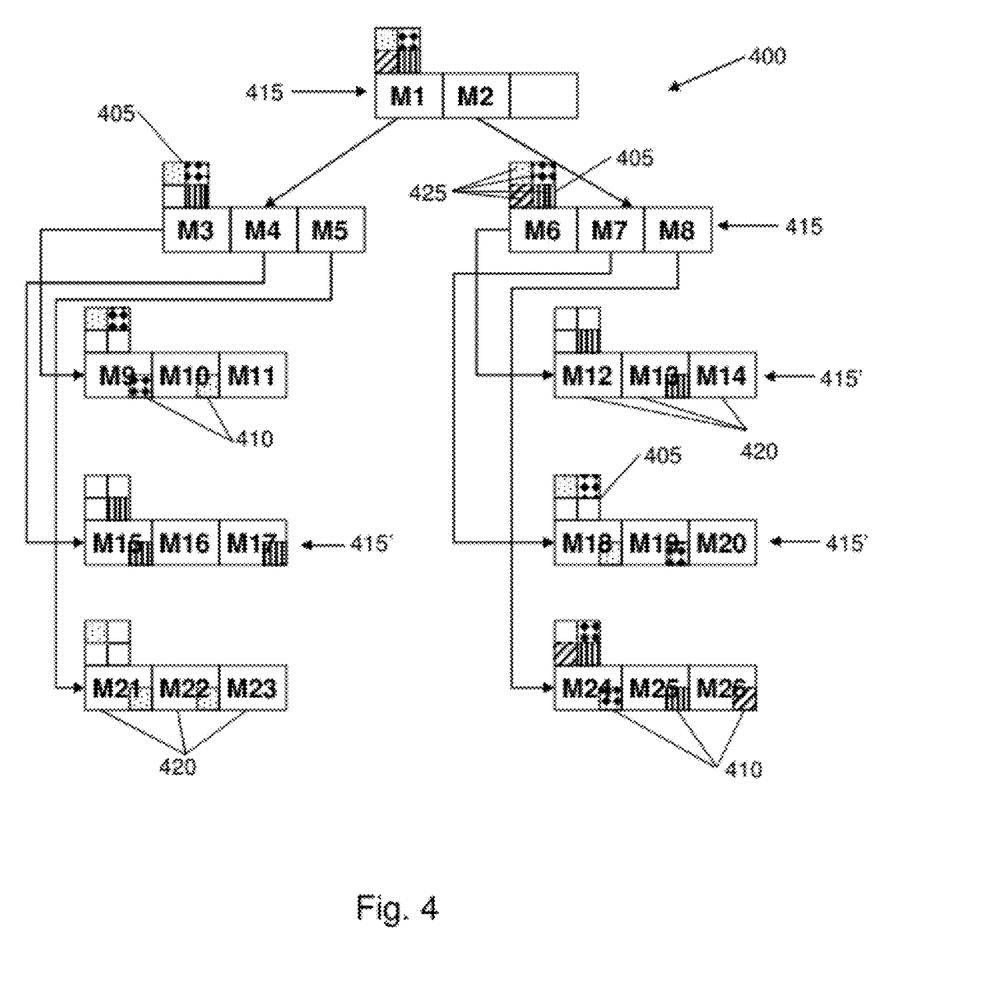
FIG. 4 shows an exemplary augmented R-tree in accordance with aspects of the invention.

FIG. 4 shows an exemplary augmented R-tree 400 according to an aspect of the invention. As shown in FIG. 4, using the augmenting/updating tool 40, a user may augment a spatial index, e.g., an R-tree, R+-tree or R*-tree, with a plurality of matching vectors 405, which indicate the information contained in the matching vector data table 200, to create the augmented R-tree 400. Each entry 420 (e.g., M1, M2, M3, etc.) in the augmented R-tree 400 represents a MBB for a defined geographical region. Additionally, the MBB represented by a parent node contains each MBB of the children nodes. For example, the MBB represented by M6 contains the MBBs represented by M12, M13 and M14.

According to an aspect of the invention, each node 415, 415' of the augmented R-tree 400 includes a matching vector 405 indicating the preferred services located in the MBBs represented by the node 415, 415'. For example, the node "M6, M7, M8" (containing individual entries 420 of M6, M7 and M8) has associated therewith a matching vector 405, which indicates each of the preferred services (as defined in the matching vector data table 200) that are located within the MBBs represented by the node "M6, M7, M8". Likewise, the node "M12, M13, M14" has associated therewith a matching vector 405, which indicates each of the preferred services (as defined in the matching vector data table 200) that are located within the minimum bounded boxes represented by the node "M12, M13, M14".

With this example, the matching vector 405 can indicate up to four different preferred services with unique identifiers 425. These unique identifiers 425 correspond to the unique identifications 235 of the matching vector data table 200. As should be understood, the invention contemplates that the matching vector 405 may be used to represent any number of preferred services.

As can be observed with the exemplary augmented R-tree 400 of FIG. 4, while the matching vector 405 of node "M6, M7, M8" indicates that all of the preferred services are located in the MBBs represented by "M6, M7, M8" (as each of the four quadrants of the matching vector 405 contain unique identifiers 425), the matching vector 405 of node "M12, M13, M14" indicates that only one type of preferred service is located within the MBBs represented by "M12, M13, M14". Further, with this exemplary embodiment, it can be observed that the one type of service located within the MBBs represented by "M12, M13, M14" is more specifically located in the MBB represented by M13, as indicated by the entry matching vector 410.

However, it should be understood that even if a matching vector 405 indicates that only one type of service is located within a particular node 415, 415', that type of service may be located in more than one child entry of the particular node. For example, the matching vector 405 of node "M15, M16, M17" indicates that only one type of preferred service is located in the MBBs represented by "M15, M16, M17". However, as can be observed, there are multiple instances of the preferred service, e.g., in the MBBs represented by M15 and M17, as indicated by the entry matching vectors 410.

Moreover, the individual entries 420 of the leaf nodes 415 (i.e., those nodes that have no children nodes) which represent an MBB having at least one preferred service will include an entry matching vector 410 indicating the at least one preferred service. While, in the exemplary embodiment of FIG. 4, the leaf entries 420, which represent individual MBBs, are indicated as having a single preferred service (as indicated by the entry matching vectors 410), it should be understood that a geographic area represented by an MBB may have any number of preferred services located therein, and thus, any individual entry 420 may have any number of preferred services indicated, as indicated by the entry matching vector 410.

With this example, the matching vector 405 can indicate up to four different preferred services with unique identifiers 425. These unique identifiers 425 correspond to the unique identifications 235 of the matching vector data table 200. The invention also contemplates that the matching vector can be used to indicate any number of preferred services.

Figure 5:
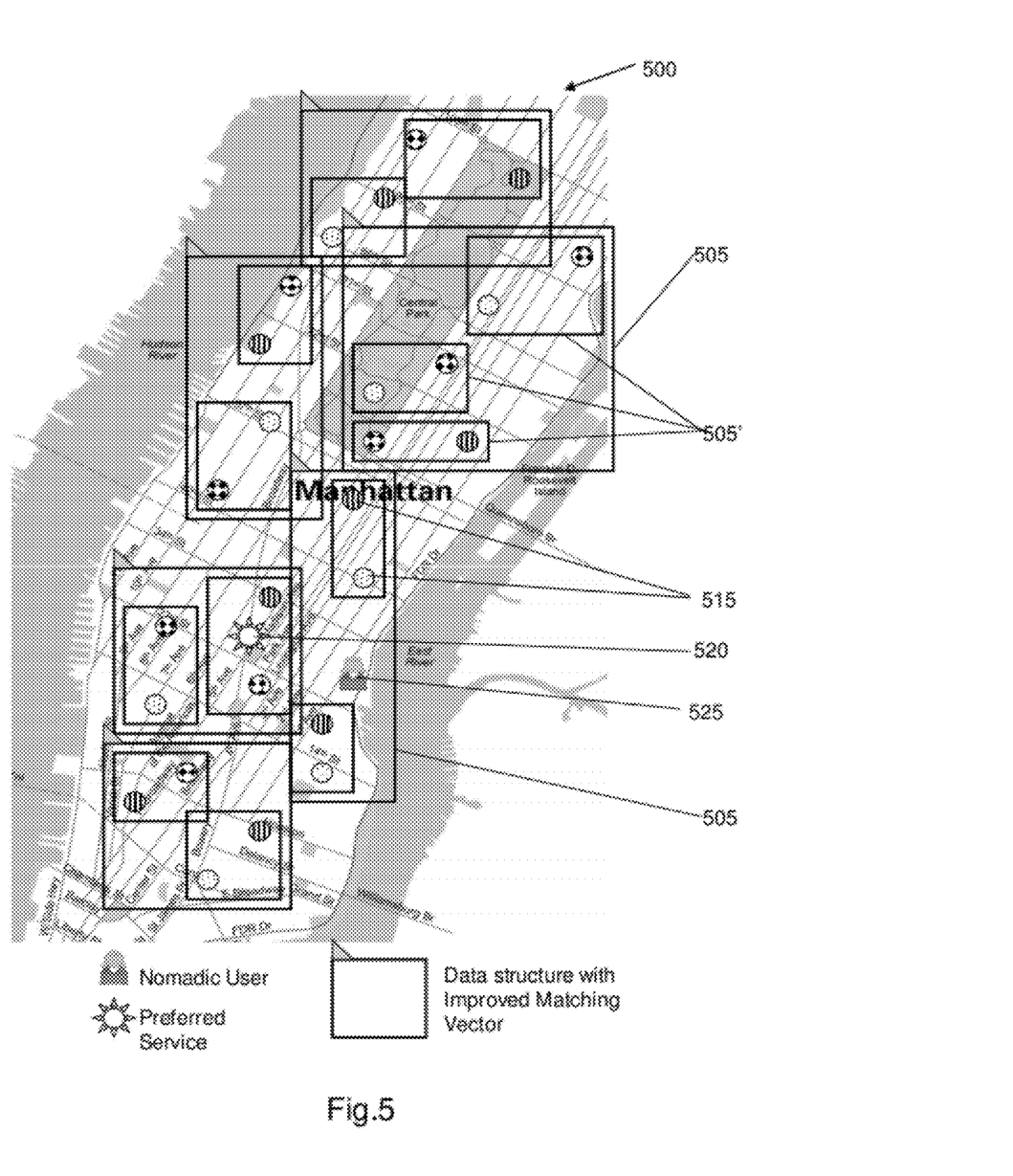
FIG. 5 shows an exemplary mapping of minimum bounded boxes in accordance with aspects of the invention.

FIG. 5 shows an exemplary mapping 500 of MBBs 505, 505' to a particular geographic area. As shown in the exemplary mapping 500 of FIG. 5, a plurality of MBBs 505, 505' are mapped to Manhattan Island, N.Y. Additionally, as shown in FIG. 5, child MBBs 505' are contained within at least one MBB 505. The creation of the MBBs 505, 505' to form the mapping 500 may performed according to methods for forming R-trees. Furthermore, in embodiments, a user may manual set and/or adjust the sizes and/or positions of the MBBs 505, 505'.

The exemplary mapping 500 may also contain indications 515 of locations of different types of preferred services. In embodiments, the indications 515 may correspond to the unique identifications 235 of the matching vector data table 200 and to the unique identifiers 425 of the matching vectors 405. FIG. 5 also shows an indication of a current location of a nomadic user 525 and an indication of a current location of a particular (or currently-sought) preferred service 520, in which the nomadic user 525 is currently interested and searching for, as discussed further below.

In embodiments, the mapping 500 may be displayed to a user, e.g., on a screen or display of the computing device 14 via the I/O device 28 of FIG. 1. This allows a user to visually see the locations of currently-sought preferred services identified by the searching tool 70.

Current Location Determination

According to a further aspect of the invention, using the position-deriving tool 50, the user may derive their current position so that they may search for or update preferred services using the above-described augmented spatial index data structure, e.g., the augmented R-tree 400. The position-deriving tool 50 may include any conventional location detection devices such as global positioning systems (GPS) for, e.g., wireless devices, latitude and longitude for mobile telephones, and/or IP address geo-location, amongst other conventional location detection devices.

User Vector

The user may utilize the user vector creation tool 60 to create a user vector indicating a preferred service the user is currently seeking (i.e., the currently-sought preferred service) and use the position-deriving tool 50 to indicate the current location of the nomadic user 525. In embodiments, the user vector may take a similar form to the above described matching vector 405.

Figure 6:
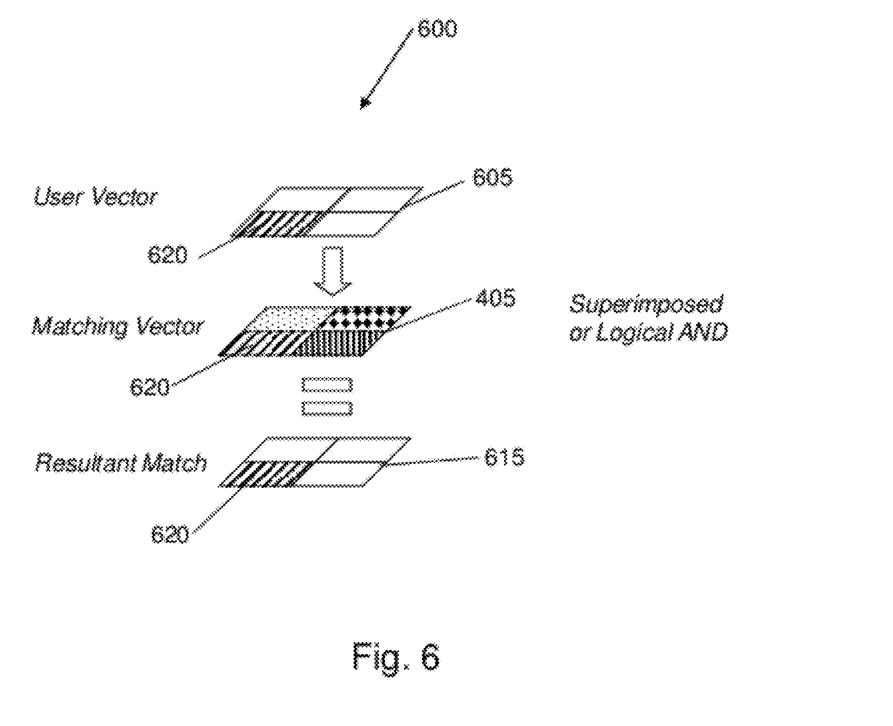
FIG. 6 shows a graphical depiction of a matching method in accordance with aspects of the invention.

FIG. 6 generally shows an exemplary pictorial representation of a user vector 605 and a matching vector 405, and how a resultant match 615 of a preferred service is determined based on the user vector 605 and the matching vector 405. As shown in FIG. 6, the user vector 605 has a similar form as the matching vector 405. Thus, with this exemplary user vector 605, while shown as indicating one currently-sought preferred service of four total preferred services, it should be understood that the invention contemplates that the user vector 605 may indicate any number (e.g., one or more) of currently-sought preferred services from amongst any number of preferred services.

Additionally, as shown in FIG. 6, the resultant match 615 may be determined by superimposing, or performing a logical AND operation, of the user vector 605 and the matching vector 405. Thus, as shown in the example of FIG. 6, a user has indicated, via the user vector creation tool 60, that they are currently seeking the preferred service designated by the unique identification 620 shown in the user vector 605. The unique identification 620 of the user vector 605 corresponds with the unique ID 235 of the matching vector data table 200 and with the unique identification 425 of the matching vector 405.

According to the invention, as described further below, the searching tool 70 may search the augmented R-tree 400 (now having matching vectors 405 for the different nodes 415, 415' and entity matching vectors 410 for the different entries, as described in FIG. 4) by comparing the user vector 605 with the plurality of matching vectors 405. Thus, as shown in the example of FIG. 6, as the matching vector 405 also has the preferred service designated by the unique identification 620, the resultant match 615 indicates that the preferred service designated by the unique identification 620 is present in the geographical region represented by an MBB associated with that particular matching vector 405.

Flow Diagrams

Figure 7:
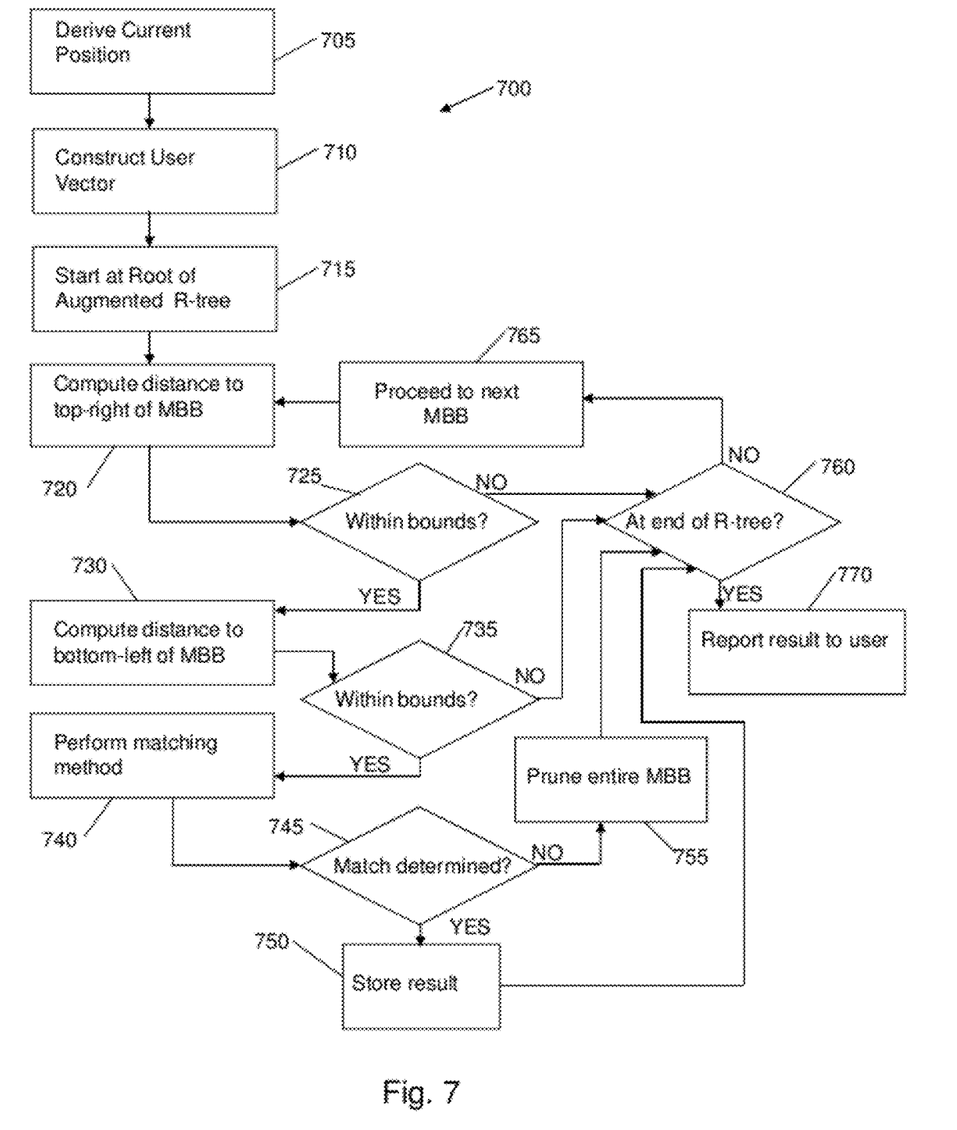
FIGS. 7-9 show flow diagrams implementing processes in accordance with aspects of the invention.
Figure 8:
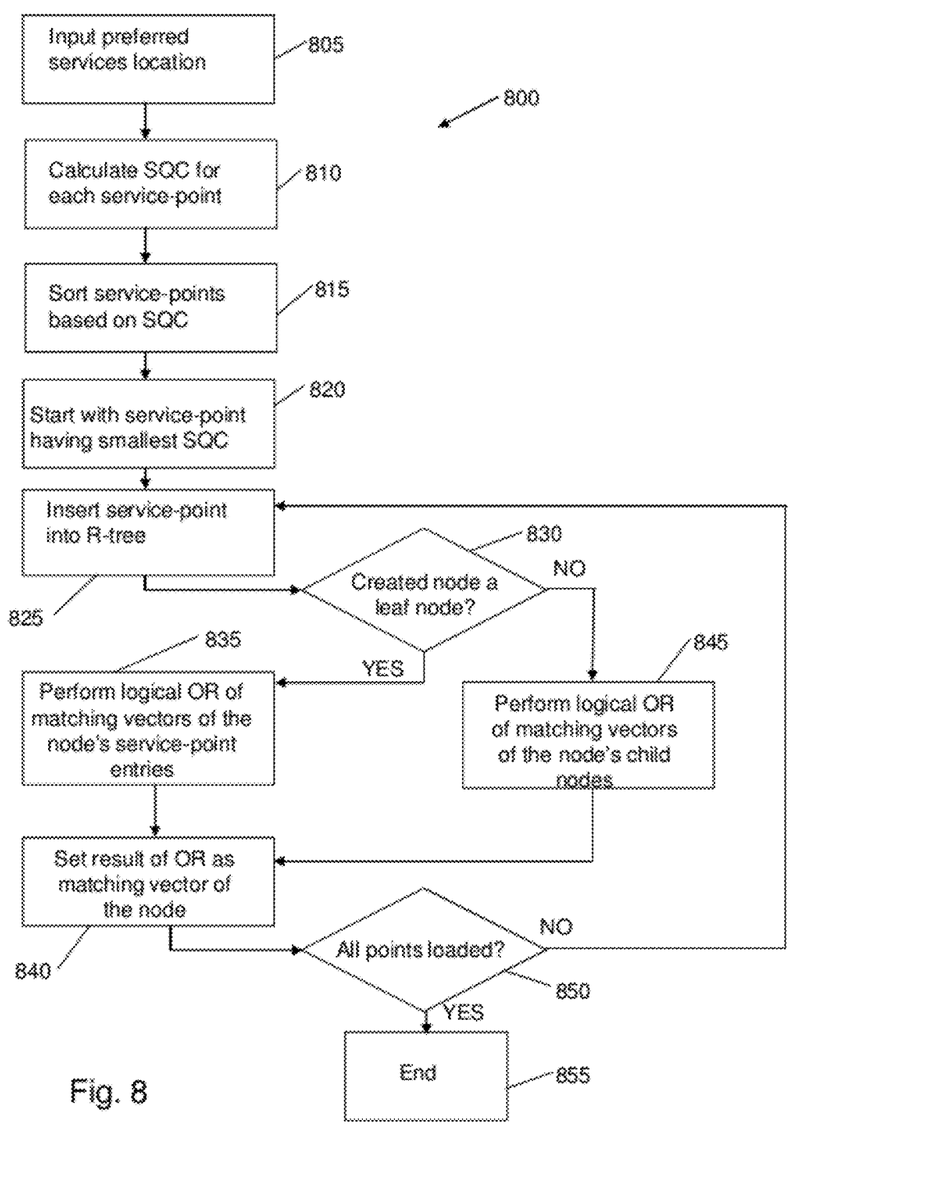
Figure 9:
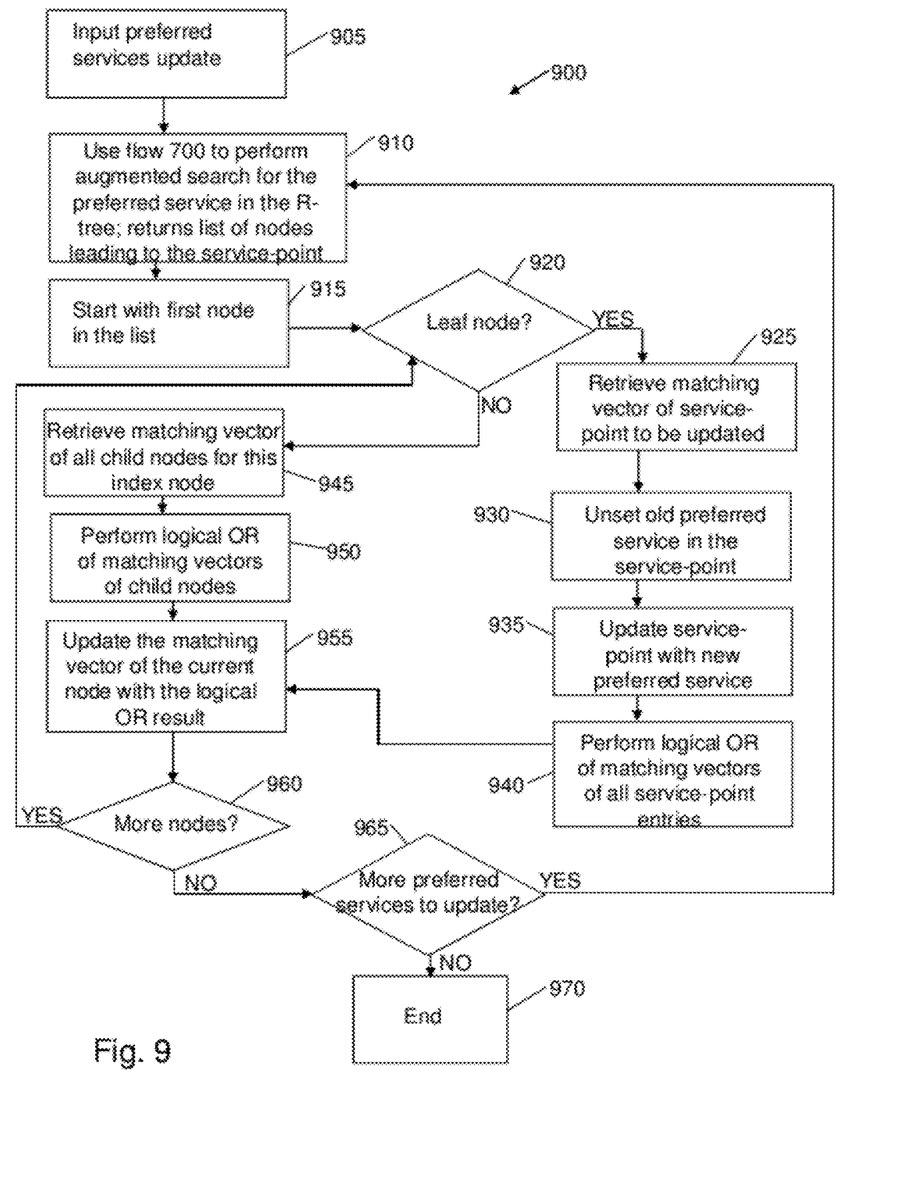

FIGS. 7-9 are flow diagrams for implementing processes of the invention, which may be implemented in the environment of FIG. 1. FIGS. 7-9 equally represent high-level block diagrams of the invention. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Search of the Data Structure

Referring to FIG. 7, a nomadic user may use the flow 700 to search the augmented spatial index data structure, e.g., the augmented R-tree 400, to identify locations of currently-sought preferred services (as indicated by the user vector 605). It should be understood that with this flow 700, the augmented spatial index data structure, e.g., the augmented R-tree 400, has already been created, as described further below.

At step 705, the user derives their current position using the position-deriving tool 50. As described above, the position-deriving tool 50 may include any conventional method or system, including, for example, IP address geo-location, GPS for wireless devices, latitude-longitude for mobile telephones, amongst other methods for determining a current position. At step 710, the user constructs a user vector using the user vector creation tool 60. At step 715, the searching tool starts at the root of the spatial index, e.g., the augmented R-tree. At step 720, the searching tool determines a distance from the user's current position to the top right of a minimum bounded box (MBB). At step 725, the searching tool determines if the user is within the bounds of the determined top-right of the MBB. If, at step 725, the searching tool determines that the user is within the bounds of the determined top-right of the MBB, at step 730, the searching tool determines a distance from the user's current position to the bottom-left of the MBB. At step 735, the searching tool determines if the user is within the bounds of the determined bottom-left of the MBB.

If, at step 735, the searching tool determines that the user is within the bounds of the determined bottom-left of the MBB, at step 740, the searching tool performs the matching method of the user vector with the matching vector for that MBB. Put another way, at steps 720, 725, 730 and 735, the MBBs are scanned sequentially and checked for spatial bounds, according to an R-tree searching method. When a spatial bound of an MBB is within the bounds of a user, the searching tool performs the matching method in accordance with the present invention. That is, as described in regard to FIG. 6, the searching tool performs a logical AND of the user vector and the matching vector for that MBB. It is to be noted that the matching vector and the corresponding user vector may be computed with basic arithmetic capabilities. This contributes to the efficiency of the overall system.

At step 745, the searching tool determines if a match was indicated by the matching method. If, at step 745, the searching tool determines that there is a match between the user vector and the matching vector for that MBB, at step 750, the searching tool stores the result in a database, e.g., in the storage system 22B of FIG. 1.

If, at step 745, the searching tool determines that there is not a match between the user vector and the matching vector for that MBB, at step 755, the entire MBB may be pruned. That is, as the searching tool has determined that there are no currently-sought preferred services (as indicated by the user vector) located anywhere in the area designated by the MBB, the searching tool can eliminate any further searching for currently-sought preferred services in the area designated by that MBB. Moreover, if the searching tool eliminates an MBB, then the entire set of descendant MBBs are discarded because they contain no currently-sought preferred services for the present position of the nomadic user. Thus, using the matching method, the searching tool eliminates irrelevant preferred services, e.g., those item/type pairs within MBBs not located within the bounds of the user's current location, and uses the comparison property to determine a set of acceptable preferred services, e.g., those located within MBBs within the bounds of the user's current location.

If, at steps 725 or 735, the searching tool determines that the user is not within the bounds of the top-right or bottom-left of the MBB, the process continues at step 760. Additionally, from either step 750 or step 755, the process continues at step 760. At step 760, the searching tool determines if the end of the augmented R-tree has been reached. If, at step 760, the searching tool determines that the end of the R-tree has not been reached, then at step 765, the searching tool proceeds to the next MBB, and the process continues at step 720. If, at step 760, the searching tool determines that the end of the R-tree has been reached, then at step 770, the searching tool reports or indicates to the user the location(s) of currently-sought preferred services based on the user's current location.

It should be understood, that while the steps have been described as occurring in a particular order, the invention contemplates that the steps may be performed in other orders. For example, step 720 may occur prior to step 730. Additionally, for example, step 770 may occur prior to step 750. Moreover, it should be understood that at steps 720 and 730, the search tool may compute the distance to the top-left and bottom-right of the MBB, respectively. Furthermore, the invention contemplates that, in embodiments, steps may be implied or omitted while still remaining true to this invention.

Creating Preferred Services Augmented R-Tree

FIG. 8 shows an exemplary flow 800 for indicating or creating a preferred service in an augmented spatial index, e.g., the augmented R-tree. Upon creating the matching vector data table 200, a user may manually or automatically create the augmented spatial index using flow 800. At step 805 a user (or another, e.g., a service provider or an advertiser) may input a representation or description a preferred service (or a list of preferred services). More specifically, the user may determine the location of the preferred service using the position-deriving tool 50, as discussed above. Moreover, the user may represent the preferred service as a matching vector (as shown in FIG. 6) using the matching vector creation tool 30 and the matching vector data table 200, as described above.

At step 810, the augmenting/updating tool calculates a space quantification co-efficient (SQC) for the location of the preferred service. The SQC is a quantitative representation of the location on a space filling curve. Any suitable space filling curve (e.g., a Hilbert curve or z-order curve) may be used, wherein the resulting values, e.g., Hilbert value, will form the SQC.

At step 815, the augmenting/updating tool sorts the location(s), or service-point(s), of the preferred service(s). At step 820, the augmenting/updating tool starts with the service-point having the smallest SQC. At step 825, the augmenting/updating tool inserts the service-point into a spatial data structure (e.g., an R-tree) using well known R-tree insertion methods.

At step 830, the augmenting/updating tool determines if the created node is a leaf node, i.e., has no dependent nodes. If, at step 830, the augmenting/updating tool determines that the created node is a leaf node, then at step 835, the augmenting/updating tool performs a logical OR of matching vectors of the node's service-point entries. At step 840, the augmenting/updating tool sets the result of the logical OR determined in step 835 as the matching vector of the node.

If, at step 830, the augmenting/updating tool determines that the created node is not a leaf node, e.g., is an index node, at step 845, the augmenting/updating tool performs a logical OR of the matching vectors of the current node's child nodes. Then, the process proceeds to step 840, wherein the augmenting/updating tool sets the result of the logical OR determined in step 845 as the matching vector of the node.

At step 850, the augmenting/updating tool determines if all service-points are loaded. If, at step 850, the augmenting/updating tool determines that all service-points have not been loaded into the augmented R-tree, then the process proceeds at step 825, such that these steps are applied iteratively to all the service-points to be loaded. If, at step 850, the augmenting/updating tool determines that all service-points have been loaded, then the process ends at step 855. It should be understood that, in embodiments, flow 800 can be applied to augmented R-trees being initially created as well as existing R-trees where the data points are to be converted to service-points.

It should be understood, that while the steps have been described as occurring in a particular order, the invention contemplates that the steps may be performed in other orders. Furthermore, the invention contemplates that, in embodiments, steps may be implied or omitted while still remaining true to this invention.

Updating Preferred Services Augmented R-Tree

FIG. 9 shows an exemplary flow 900 for updating preferred services and their associated preferences. Upon updating the matching vector data table 200, a user may manually or automatically update the spatial index using flow 900. At step 905, a user inputs a preferred service update, e.g., a service-point update. At step 910, the user may use flow 700 to perform a search of the augmented R-tree, which returns a list of nodes starting with the leaf nodes leading to the service-point. The result of the search includes the full traversal, i.e., all the nodes from the root of the R-tree to the leaf that contains the preferred service to be updated.

At step 915, the augmenting/updating tool starts with the first node in the list. At step 920, the augmenting/updating tool determines if the node is a leaf node. The first node is usually the leaf node itself, thus the augmenting/updating tool may first perform the update in the leaf node. If, at step 920, the augmenting/updating tool determines that the node is a leaf node, at step 925, the augmenting/updating tool retrieves the entry matching vector of the service-point to be updated. At step 930, the augmenting/updating tool unsets the old preferred service in the service-point. At step 935, the augmenting/updating tool updates the service-point with the new preferred service. At step 940, the augmenting/updating tool performs a logical OR of the entry matching vectors for all the service-point entries for that leaf node. At step 955, the augmenting/updating tool updates the matching vector of the current leaf node with the logical OR result determined at step 940.

If, at step 920, the augmenting/updating tool determines that the current node is not a leaf node, at step 945, the augmenting/updating tool retrieves the matching vector of all child nodes for this current index node. At step 950, the augmenting/updating tool performs a logical OR of the matching vectors of the child nodes. At step 955, the augmenting/updating tool updates the matching vector of the current node with the logical OR result determined at step 950. That is, the preferred services update is propagated to the containing index node by combining the matching vectors of all the leaf nodes beneath the index node.

At step 960, the augmenting/updating tool determines whether there are more nodes. If, at step 960, the augmenting/updating tool determines that there are more nodes, the process continues at step 920. The augmenting/updating tool progresses upward through the R-tree and updates all the matching vectors for all the index nodes at each level.

If, at step 960, the augmenting/updating tool determines that there are no more nodes, at step 965, the user manually or the augmenting/updating tool automatically determines if there are more preferred services to update. If, at step 965, the user or the augmenting/updating tool determines that there are more preferred services to update, the process continues at step 910. If, at step 965, the user or the augmenting/updating tool determines that there are no more preferred services to update, then the process ends at step 970.

Figure 10:
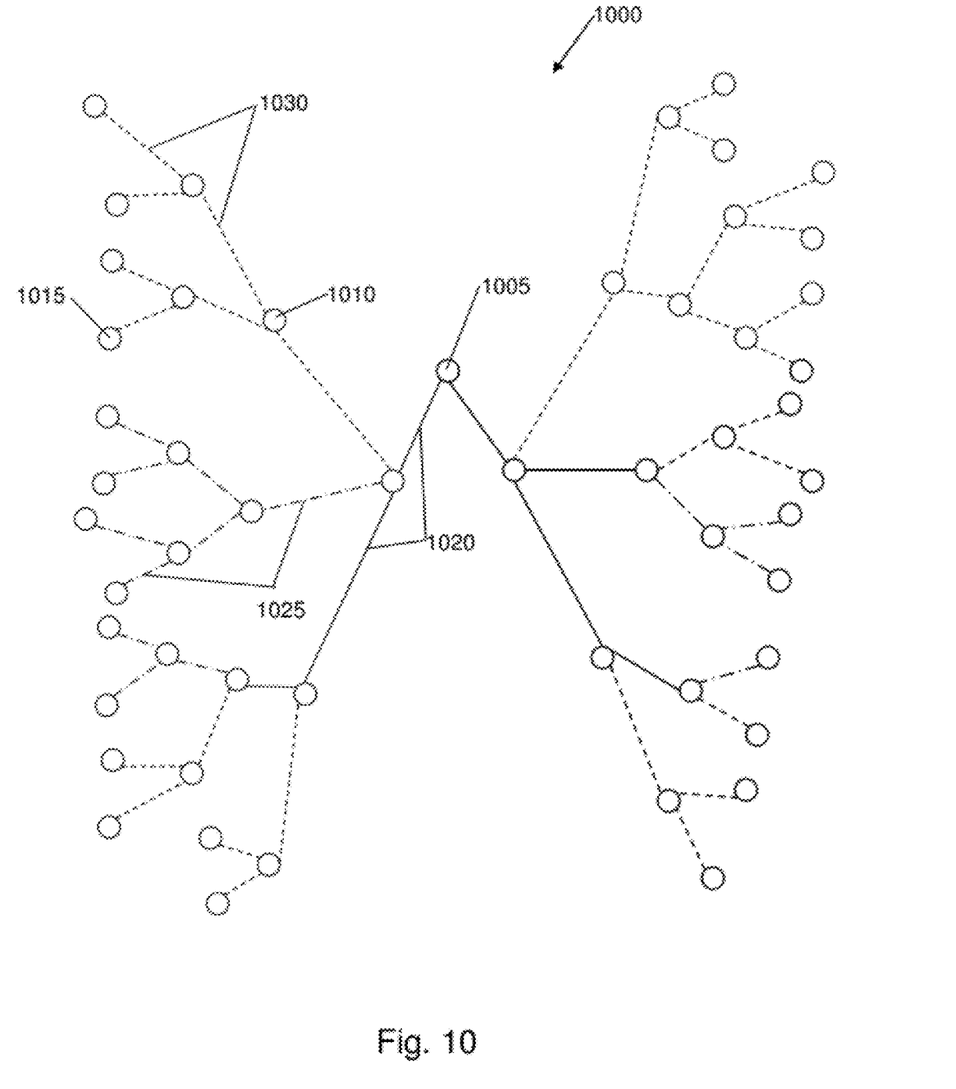
FIGS. 10 and 11 show an exemplary depiction of a resulting pruning of paths of a spatial index in accordance with aspects of the invention.
Figure 11:
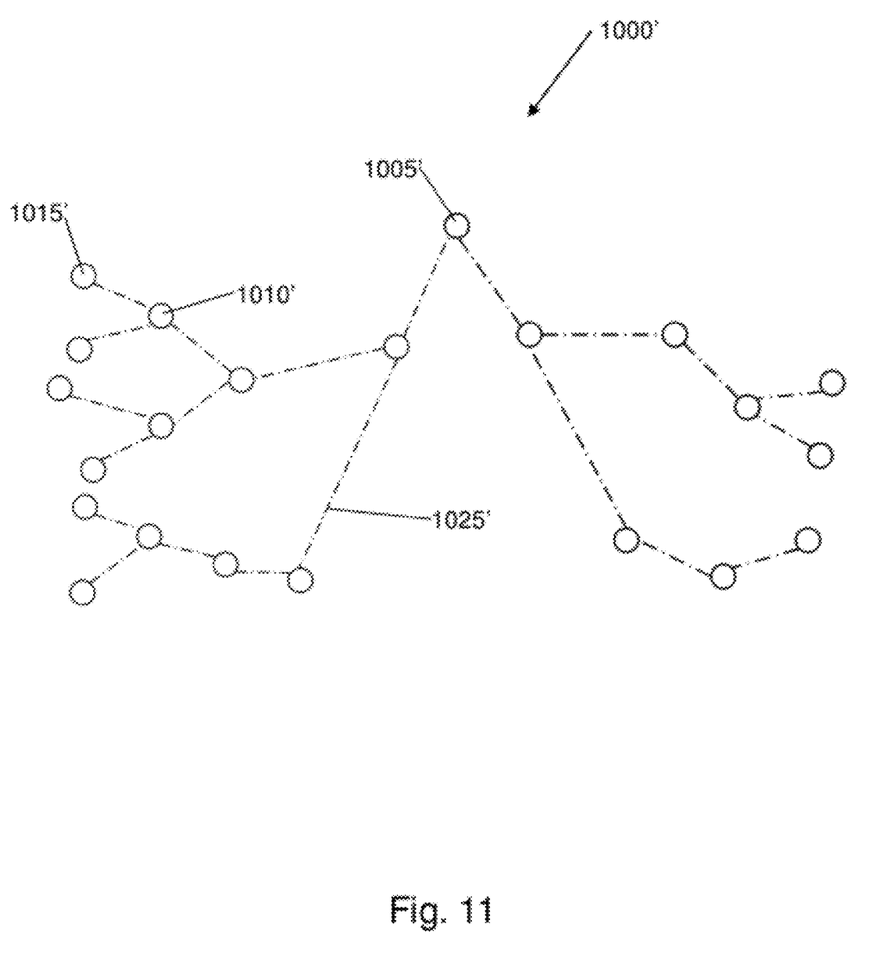

FIGS. 10 and 11 illustrate how utilizing the present invention eliminates up to 60% of irrelevant spatial results. As discussed above, this is a 40% improvement (at least) over known methods. FIG. 10 shows an exemplary spatial index 1000 in accordance with the present invention. The spatial index 1000 includes a root node 1005, a plurality of index nodes 1010 and a plurality of leaf nodes 1015. In order to facilitate an explanation of the invention, with the exemplary spatial index 1000, only two types of preferred services are shown. Moreover, these two types of preferred services are indicated by the connecting lines between the nodes, wherein the dashed-dot lines 1025 indicate the presence of preferred service "A" and dashed lines 1030 indicate the presence of preferred service "B". Additionally, if a parent node is connected to children nodes that have both preferred service "A" and preferred service "B", solid line 1020 connects the nodes. As shown in FIG. 10, the spatial index 1000 includes 28 leaf nodes.

If a user was only interested in preferred service "A", the user may indicate this interest utilizing the user vector 405, as described above. Moreover, using the positioning-deriving tool 50, the user can determine their current location. Then, by implementing aspects of the present invention, those irrelevant paths in the spatial index may be removed. Thus, as described above, those nodes representing MBBs that are not within a particular distance of the user and those nodes representing MBBs that do not have the currently-sought preferred services may be removed from consideration.

FIG. 11 shows a modified spatial index 1000', wherein those irrelevant paths have been removed. That is, those nodes representing MBBs that are not within a particular distance of the user and/or that do not have the currently-sought preferred services, and their paths have been pruned or removed from the modified spatial index 1000'. As shown in FIG. 11, using the present invention, a large number of nodes, e.g., those containing preferred service "B", have been removed. Moreover, as shown in FIG. 11, as each of the remaining nodes contain the preferred service "A", each of the lines are now dashed-dot lines 1025'. Now, rather than searching or considering the twenty-eight leaf nodes 1015 of spatial index 1000 shown in FIG. 10, a user may only need to search or consider the nine leaf nodes 1015' of the spatial index 1000' shown in FIG. 11.

While the invention has been described in terms of embodiments, those skilled in the art will recognize that the invention can be practiced with modifications and in the spirit and scope of the appended claims.

What is claimed is:

1. A method of locating preferred services, comprising:
 searching an augmented spatial index, which is based on a user's determined preferred services, the searching comprising:
  deriving a current position,
  constructing a user vector indicating one or more currently-sought preferred services identified by a unique identifier,
  determining if the current position is within a boundary represented by a node of the augmented spatial index, and
  if the current position is within the boundary represented by the node, performing a matching method of the user vector and a matching vector of the node, wherein the matching method comprises determining if the unique identifier of the user vector corresponds with a unique identifier of the matching vector; and
 indicating a location of the one or more currently-sought preferred services.

2. The method of claim 1, wherein the augmented spatial index comprises at least one of:
 an augmented R-tree;
 an augmented R+-tree; and
 an augmented R*-tree.

3. The method of claim 1, wherein the augmented spatial index comprises:
 a spatial index including a root node, at least one index node and at least one leaf node, wherein each of the root node, the at least one index node and the at least one leaf node comprise at least one entry; and
 a matching vector associated with each of the at least one index node, the at least one leaf node, and the at least one entry of the at least one leaf node.

4. The method of claim 3, wherein each entry of the at least one entry represents a boundary in a geographical area.

5. The method of claim 1, further comprising creating the augmented spatial index, which comprises:

creating matching vectors for at least one preferred service; and
 augmenting a spatial index with the matching vectors.

6. The method of claim 5, wherein the creating the matching vectors comprises:
 determining a location of the at least one preferred service;
 indicating at least one of an item, a type, a distance and a price for the at least one preferred service;
 designating an identification to the at least one preferred service based on at least one of the item and the type as the matching vector; and
 storing the location, the at least one of the item, the type, the distance and the price for the at least one preferred service and the identification.

7. The method of claim 6, wherein the creating the matching vectors further comprises generating a matching vector data table with at least one field defining the one or more preferred services.

8. The method of claim 1, further comprising updating the augmented spatial index with a plurality of matching vectors that indicate information corresponding to a matching vector table.

9. The method of claim 1, wherein a service provider at least one of deploys, creates, maintains and supports a computer infrastructure that performs the steps of claim 1.

10. The method of claim 1, wherein steps of claim 1 are provided by a service provider on a subscription, advertising, and/or fee basis.

11. The method of claim 1, wherein the boundary is a bounds of a minimum bounded box (MBB).

12. The method of claim 11, wherein the search further comprises if the current position is not within bounds of the MBB represented by the node, proceeding to a next node of the augmented spatial index.

13. A method for locating preferred services, comprising:
 providing a computer infrastructure being operable to:
  create and update an augmented spatial index based on preferred services, the creation of the augmented spatial index comprising:
   creating matching vectors for at least one preferred service identified by a unique identifier; and
   augmenting a spatial index to include a matching vector at each leaf node;
  search the augmented spatial index; and
  indicate a location of one or more currently-sought preferred services,
 wherein the augmenting the spatial index with the matching vectors comprises:
  inputting a location of the at least one preferred service,
  inserting a service-point representative of the at least one preferred service into an entry of the leaf node of the spatial index,
  setting matching vectors for the entries of leaf nodes of the spatial index, and
  setting matching vectors for nodes of the spatial index.

14. The method of claim 13, wherein the computer infrastructure is created, maintained, deployed and supported by a service provider.

15. A system comprising:
 a CPU, a computer readable memory and a computer readable storage media;
 first program instructions to search an augmented spatial index, which is based on a user's determined preferred services, the searching comprising:
  deriving a current position, constructing a user vector indicating one or more currently-sought preferred services identified by a unique identifier, determining if the current position is within a boundary represented by a node of the augmented spatial index, and if the current position is within the boundary represented by the node, performing a matching method of the user vector and a matching vector of the node, wherein the matching method comprises determining if the unique identifier of the user vector corresponds with a unique identifier of the matching vector; and second program instructions to indicate a location of the one or more currently-sought preferred services, wherein the first and second program instructions are stored on the computer readable storage media for execution by the CPU via the computer readable memory.

16. The system of claim 15, further comprising creating the augmented spatial index, which comprises:

creating matching vectors for at least one preferred service; and augmenting a spatial index with the matching vectors.

17. The system of claim 16, wherein the creating the matching vectors comprises:

determining a location of the at least one preferred service;

indicating at least one of an item, a type, a distance and a price for the at least one preferred service;

designating an identification to the at least one preferred service based on at least one of the item and the type as the matching vector; and storing the location, the at least one of the item, the type, the distance and the price for the at least one preferred service and the identification.

18. The system of claim 17, wherein the creating the matching vectors further comprises generating a matching vector data table.

19. The system of claim 15, wherein the boundary is a bounds of a minimum bounded box (MBB).

20. The system of claim 15, wherein the search further comprises if the current position is not within bounds of the MBB represented by the node, proceeding to a next node of the augmented spatial index.

* * * * *